(12) United States Patent
Ahdoot (10) Patent No.: US 7,980,832 B2
(45) Date of Patent: Jul. 19, 2011

(54) WAVE ENERGY CONVERTER

(76) Inventor: Ned M. Ahdoot, Rancho Palos Verdes, CA (US)

( * ) Notice: Subject to any disclaimer, the term of this patent is extended or adjusted under 35 U.S.C. 154(b) by 510 days.

(21) Appl. No.: 11/788,528

(22) Filed: Apr. 19, 2007

(65) Prior Publication Data
US 2008/0260548 A1    Oct. 23, 2008

(51) Int. Cl.
*F04B 35/00* (2006.01)

(52) U.S. Cl. ........ 417/333; 417/330; 417/331; 417/337; 60/498; 290/42

(58) Field of Classification Search ............ 417/100, 417/330, 331, 333, 334, 337; 290/42, 53, 290/43; 60/498, 502
See application file for complete search history.

(56) References Cited

U.S. PATENT DOCUMENTS

| | | | |
|---|---|---|---|
| 3,595,189 A * | 7/1971 | McLean et al. | ............... 114/382 |
| 4,034,231 A | 7/1977 | Conn et al. | |
| 4,071,305 A | 1/1978 | Ootsu | |
| 4,208,878 A * | 6/1980 | Rainey | ............. 60/496 |
| 4,418,286 A | 11/1983 | Scott | |
| 4,464,578 A | 8/1984 | Masubuchi | |
| 4,495,765 A | 1/1985 | French | |
| 4,544,849 A | 10/1985 | Choi | |
| 4,598,211 A | 7/1986 | Koruthu | |
| 4,672,222 A | 6/1987 | Ames | |
| 4,718,231 A | 1/1988 | Vides | |
| 4,851,704 A * | 7/1989 | Rubi | ............... 290/53 |
| 4,864,152 A | 9/1989 | Pedersen | |
| 5,184,915 A | 2/1993 | Marino | |
| 5,186,822 A * | 2/1993 | Tzong et al. | ............... 210/122 |
| 5,647,730 A * | 7/1997 | Woollatt | ............... 417/274 |
| 5,909,060 A * | 6/1999 | Gardner | ............... 290/53 |
| 6,575,712 B1 * | 6/2003 | Slavchev | ............... 417/331 |
| 6,812,588 B1 * | 11/2004 | Zadig | ............... 290/53 |
| 6,953,328 B2 | 10/2005 | Welch | |
| 6,955,049 B2 | 10/2005 | Krouse | |
| 6,956,299 B2 | 10/2005 | Molina et al. | |
| 6,967,413 B2 | 11/2005 | Atiya | |
| 7,002,261 B2 | 2/2006 | Cousins | |
| 7,003,955 B2 | 2/2006 | Davis | |
| 7,023,104 B2 * | 4/2006 | Kobashikawa et al. | ......... 290/42 |
| 7,033,111 B2 | 4/2006 | Lee | |
| 7,042,111 B2 | 5/2006 | Poteet et al. | |
| 7,042,112 B2 | 5/2006 | Wood | |
| 7,042,113 B2 | 5/2006 | Aukon | |
| 2003/0193197 A1 * | 10/2003 | Hibbs et al. | ............... 290/53 |
| 2005/0066654 A1 * | 3/2005 | Koivusaari | ............... 60/398 |
| 2005/0158184 A1 * | 7/2005 | Lin | ............... 417/334 |
| 2005/0169774 A1 * | 8/2005 | Welch et al. | ............... 417/337 |

* cited by examiner

*Primary Examiner* — Devon C Kramer
*Assistant Examiner* — Leonard J Weinstein (57) ABSTRACT

A stationary structure is mounted on the floor of an ocean or other body of water subject to wave motion. The structure provides a floatation body that moves with the waves and is able to drive a sealing plate in a compression chamber. When the water level changes, or wave action magnitude changes, a second sealing plate is able to move automatically to maintain a constant size of the compression chamber. Air compressed in the chamber is let into a tank to maintain a constant elevated pressure in the tank and the air pressure is used to power a turbine to generate electricity. In an alternate embodiment, a mechanical linkage drives the turbine directly.

4 Claims, 7 Drawing Sheets

| STATE | Switch 68 | Switch 64 | Switch 66 | Switch 62 | Condition | Corrective Action |
|---|---|---|---|---|---|---|
| 1 | 0 | 0 | 0 | 0 | No wave, | Shrink WCC volume* |
| 2 | 0 | 0 | 0 | 1 | Not applicable | |
| 3 | 0 | 0 | 1 | 0 | Not applicable | |
| 4 | 0 | 0 | 1 | 1 | Not applicable | |
| 5 | 0 | 1 | 0 | 0 | Tidal level is high | Raise Compressor |
| 6 | 0 | 1 | 0 | 1 | Tidal level is too high | Raise Compressor |
| 7 | 0 | 1 | 1 | 0 | Not applicable | |
| 8 | 0 | 1 | 1 | 1 | Not applicable | |
| 9 | 1 | 0 | 0 | 0 | Tide level is too low | Lower Compressor |
| 10 | 1 | 0 | 0 | 1 | Not applicable | |
| 11 | 1 | 0 | 1 | 0 | Low tide | Lower Compressor |
| 12 | 1 | 0 | 1 | 1 | Not applicable | |
| 13 | 1 | 1 | 0 | 0 | Desired condition | No Change |
| 14 | 1 | 1 | 0 | 1 | Tidal level is too high | Raise Compressor |
| 15 | 1 | 1 | 1 | 0 | Tidal level is low | Lower Compressor |
| 16 | 1 | 1 | 1 | 1 | Big waves | Enlarge* WCC volume |

WAVE ENERGY CONVERTER

BACKGROUND OF THE INVENTION

1. Field of the Present Disclosure

This disclosure relates generally to machines for harnessing ocean wave movement to create useful work such as the generation of electricity.

2. Description of Related Art Including Information Disclosed Under 37 CFR 1.97 and 1.98

Wood; Charles W. U.S. Pat. No. 7,042,112 discloses an omni-directional system configured to convert the kinetic and potential energy in ocean waves to electrical energy or in some special cases to other forms of energy such as heat, mechanical and pressure energy. The system employs a float moored by a single hydraulic cylinder anchored to the seabed. Wave energy is captured as the float is displaced vertically and horizontally in response to wave action extending the hydraulic cylinder that in turn forces fluid under high pressure to the float where appropriate valves, hydraulic accumulators, and variable displacement hydraulic motors are arranged to drive electric generators. A secondary benefit of the system is the reduction of near shore erosion.

Lee; Koo Shik U.S. Pat. No. 7,042,112 discloses 1 hydraulic power generating system designed to minimize equipment costs by simplifying the configuration thereof, to maximize efficiency of power generation by reducing loss in hydraulic power, and to allow economical and convenient maintenance of the system. The system comprises a power generator, a buoy floating the power generator on the surface of the water, and a fixing apparatus restricting movement of the buoy and the power generator. The power generator comprises a looped rail, a plurality of pulleys moving along the rail, a coupler to join the plurality of pulleys, a plurality of wings, each being installed to each of the pulleys to move the pulley by absorbing flow energy of water, and a generator installed in the rail to generate electricity after receiving kinetic energy of the pulleys through power transmission gears. The system is enhanced in its configuration, allowing economical and convenient maintenance of the hydraulic power generating system, while not being restricted as to the location where the power generator may be installed.

Yumita; Yukinobu, Kumagai; Hideo U.S. Pat. No. 7,042,111 discloses a hydraulic power generating device includes a main body case forming a flow passage provided with a water wheel chamber between a fluid inlet port and a fluid outlet port, a cover covering the main body case, a water wheel for power generation disposed in the water wheel chamber, a rotor magnet for rotating in cooperation with the water wheel. An ejection port including a groove is formed on the main body case for ejecting fluid toward the blades of the water wheel at a high speed and an protrusion part is formed on the cover for adjusting the aperture area of the ejection port by entering into the groove. Further, a discharge space is formed at a downstream position of the water wheel chamber so as to be in communication with the fluid outlet port, to which fluid after having rotated the water wheel is ejected and a stagnation preventing protrusion part is formed in the discharge space to facilitate flow of air bubbles to the fluid outlet port.

Davis; Lester U.S. Pat. No. 7,003,955 discloses an enhanced pumped storage power system. More particularly, the invention is a regenerative power system that utilizes the gravitational forces of downward movement of large quantities of water to convert same to electrical energy. In the preferred mode of implementation, the system utilizes a man-made lake at a first level of elevation. Though higher altitudes can be effective, the lake need only be approximately twenty to thirty feet in elevation. The lake, which may exceed one hundred acres in size, may be elevated above and adjacent a natural body of water, such as seawater at a coastline. As such, sandy terrain associated with the region facilitates initial construction of the system. An underground generator is utilized for the power conversion and pumping of the water back to the upper reservoir during times of low energy demand, allowing for significant noise reduction. Importantly, the system of the present invention may be utilized to provide significant levels of power to serve relatively large geographic areas during times of peak energy demand, when other sources of power are more expensive and subject to power outages. Finally, it should be noted that the components of the system are aesthetically-pleasing in nature, allowing the system to be effectively utilized in a residential area.

Cousins; Edward Thomas U.S. Pat. No. 7,002,261 discloses a method and apparatus is described for a downhole submersible electrical power generator. The electrical power generator includes a housing forming a fluid conduit. An inlet is disposed on the housing. Also, an outlet is disposed on the housing where the inlet and the outlet are adapted to allow a fluid to flow into and out of the housing, respectively. A fluid flow powered electrical power generator is disposed inside the housing and is adapted to generate electrical power from the fluid flowing through the housing. An isolation packer is disposed outside the housing between the inlet and the outlet where the isolation packer is adapted to isolate the inlet and the outlet in different zones in a wellbore.

Serrano Molina; Jose Antonio (Barcelona, ES); Serrano Cabello; Jose Antonio (Barcelona, ES); Arcos Montes; Juan Manuel (Montcada I Reixac, ES); Puerta Sardo; Ferran Josep (Terrasa, ES); Garcia-Calvillo Miralles; Manuel Antonio (Esparreguera, ES); Lopez Huete; Jose Doroteo (L'Hospitalet de Llobregat, ES) U.S. Pat. No. 6,956,299 Includes at least one floating body (1), and is characterised in that includes a device (2) fitted inside said body (1) for transforming the movement of the floating body (1) into pneumatic or hydraulic energy and means for transmitting the energy to dry land or to a fixed structure. An energy-generation system is obtained thereby with a manufacturing time and cost lower than the systems currently known. Moreover, the fact that the transforming device (2) is fitted inside the floating body (1) means that it is protected against corrosion caused by the water, against sharp movements caused by marine currents and against other possible outside agents which might harm or damage any of the components which make up the device.

Krouse; Wayne F. U.S. Pat. No. 6,955,049 discloses a machine and system for power generation through movement of water having an array of power generating cells electrically interconnected, where the array is configured in an interchangeable modular fashion and the cells are positioned to receive kinetic energy from the movement of water to generate electricity through the movement of an electrical turbine within each cell. The individual turbines and cells may generate relatively small amounts of electricity and use polymer magnetics in the impellers and windings in the turbine to withstand ocean environments and are stacked on electrically conductive trays for ease of installation and replacement.

Aukon; Dennis W. U.S. Pat. No. 7,042,113 discloses a hydroelectric generator having a fixed axle, at least one transmission axle parallel to the fixed axle, and a transmission system configured to rotate the transmission axle about the fixed axle and to apply a force to at least one driven member of a device for generating electricity.

Atiya Ramez U.S. Pat. No. 6,967,413 discloses the Tidal Energy System is a structure capable of extracting energy from the potential and kinetic energies of the tides, as well as from ocean waves and offshore wind. Its components operate synergistically in multiple capacities to extract energy from these sources so that the Tidal Energy System operates as unit. The Tidal Energy System is structured so that it can be operated integrally with electrolyzer and fuel cell technology to produce on demand power thus eliminating the pulse character of conventional tidal power. The Tidal Energy System can also generate hydrogen as an end product.

Keneth W Welch U.S. Pat. No. 6,953,328 B2 discloses a buoyancy pump device for use in fluid. The buoyancy pump device includes a buoyancy block housing defining a buoyancy chamber therein through which the fluid may flow. A buoyancy block is disposed within the buoyancy chamber to move axially therein in a first direction responsive to rising of the fluid in the buoyancy chamber and a second direction responsive to lowering of the fluid in the buoyancy chamber. A piston cylinder is connected to the buoyancy block housing and has at least one valve disposed therein operating as an inlet in response to movement of the buoyancy block in the second direction and an outlet in response to movement of the buoyancy block in the first direction. A piston is slideably disposed within the piston cylinder and connected to the buoyancy block, the piston being moveable in the first and second directions and responsive to movement of the buoyancy block in the second direction to draw a gas or liquid substance into the piston cylinder through the at least one valve, and responsive to movement of the buoyancy block in the first direction to output the gas or liquid substance through the at least one valve.

Conn et al., U.S. Pat. No. 4,034,231 discloses a machine for harnessing the motion of ocean waves in order to convert the motion energy into useful electrical power; the machine consists of a large V-shaped frame, submerged near a beach, having its apex pointed away from the beach, and the frame supporting a series of water turbines connected to an electric generator so that incoming waves toward a beach move along the outer side of the frame while turning the turbine rotors, and outgoing waves moving along the inner side of the frame turn the turbine rotors.

Ootsu, U.S. Pat. No. 4,071,305 discloses a set of aligned transducer units that are fixedly disposed in the sea. Each unit includes two atmosphere compartments on the opposite end portions so that a sea water stream created by tidal current flowing through its lower portion, between the compartments, drives an impeller disposed between the compartments. The sea water stream rotating the impeller actuates air cylinders disposed in both atmosphere compartments communicating with the atmosphere. The air cylinders compress the air to produce high pressure air. This high pressure air from all the cylinders is transported through a common pipe to an adjacent shore where it may be converted into electrical energy. A ballast water room with its control is connected to the underside of the transducer set for floating and sinking the apparatus.

Rainey, U.S. Pat. No. 4,208,878 discloses a tide motor energy source which includes a tidal piston with a valved chamber. The piston drives a hydraulic ram to generate electrical power through a pressure accumulator and hydraulic motor. The ram can be locked hydraulically to enable the tidal piston to be held fixed at a desired elevation. The valves in the chamber permit it to be filled with water or air. The piston with its chamber filled with air at its low tide position and then released for controlled ascent, while submerged, acts as a submerged float for driving the ram upwardly while the tide runs in during one phase of its operation. The piston with its chamber filled with water, while locked at its highest position as the tide begins to run out, and then released to fall under control, acts as a weight suspended in air after the water level drops below the piston for driving the ram downwardly during the second phase of its operation. The rising and falling motion of the tidal piston is used as the energy source.

Scott, U.S. Pat. No. 4,418,286 discloses an electric generator system which is wave and/or tidal driven and includes energy storage means to allow a constant electrical output to be realized. The above is accomplished through a counterbalanced walking beam which is wave driven. This beam is connected to one way ratchet drives and an interconnected spring system of varying torque capacities. A governor is connected to the spring system thereby allowing the generator to be driven at a constant speed.

Masubuchi, U.S. Pat. No. 4,464,578 discloses a wave energy converter comprising a float group including at least two floats connected by elongated rigid links disposed at a right angle to the direction of incidence of waves, of which floats are free from the coastal ground and sea bed, and allowed to heave, to sway, and to roll. A dynamic system of the converter absorbs the wave energy through the relative movements between the floats and the links, and between the adjacent links while the natural frequency of this system is approximately tuned to the frequency of the incident wave. In this way, the reflected waves and transmitted waves caused by this system are suppressed substantially since the energy of the incident wave is virtually absorbed. The wave energy converter may be provided with some air chambers and air turbines or one-directional rotating means actuated by this dynamic system, so as to drive electric generators coupled thereto.

French, U.S. Pat. No. 4,495,765 discloses an invention providing a device for converting wave energy into useful work, and comprises a body adapted to be moved to and fro by waves on a liquid, and means such as a hydraulic piston in a cylinder for converting this movement of the body into a power output. The body may be disposed about a horizontal cable along which the to and fro movement of the body is arranged to occur, the cable being secured to the piston so that relative movement between the body and the cable results in displacement of the piston in the cylinder. A plurality of cables may be threaded through the body, and some of these cables may be in mutually perpendicular relationship to each other to provide a device having an omnidirectional wave energy conversion capability.

Choi, U.S. Pat. No. 4,544,849 discloses an invention relating to a method and apparatus for tidal electric power generation using the buoyancy energy of the tide. The present invention includes a buoyant container having a balancing buoyant room and a flood gate, a power transmission apparatus having a converting apparatus, and a four-way valve. The buoyancy force of the buoyant container is decreased during the upward movement of the container, while the kinetic energy decreases during the downward movement of the container. With control of the four-way valve, the decreasing buoyancy force is partially compensated for by the pumping of water from the buoyant container and the kinetic energy is reinforced by filling the buoyant container with water. The converting apparatus comprises two conic helical gears. By using the conic helical gear, the buoyancy force and the kinetic energy are constantly transmitted into the pump. Particularly, this invention contains a brake which holds the buoyant container at a height where the weight of the buoyant container balances with the buoyancy force. At the ebb and flow of the tide, the brake is released and instantaneous force is produced. By virtue of the present invention, the greater energy can be obtained with little energy loss compared with the conventional manner.

Koruthu, U.S. Pat. No. 4,598,211 discloses a float/weights that are positioned in tidal water, arranged to rise and fall with the tides. A power unit including a cylinder and piston is arranged with the piston, connected with the float/weights, and draws water into it upon the float/weights rising and forcing it into a storage unit upon the float/weights dropping. The storage unit includes a cylinder and a weighted piston. After the storage unit is filled, the water is let out to drive a water turbine and generator. The apparatus may use a closed circuit for the water, or an open circuit and draw it directly from the sea, and return it to the sea. In the use of a closed circuit, instead of sea water, the apparatus may use fresh water, or oil. The apparatus is also adapted to use compressed gas instead of liquid.

Ames, U.S. Pat. No. 4,672,222 discloses a self-stabilized and modularly expandable system of independently operative point absorbers with respective drive transmissions and electrical generators which produce electricity from wave motion on a body of water.

Vides, U.S. Pat. No. 4,718,231 discloses an assembly comprised of an elongated float member which floats on the surface of a body of water, having waves moving therealong. A support arm freely and pivotally connects to the float member for maintaining the float member parallel to the surface of the water. The support arm member is effective to maintain the float member with its longest dimension disposed in a direction parallel to the length of the waves moving along the surface of the body of water. A transmission assembly is responsive to the support arm member as the float member moves up and down with the movement of the waves to produce a rotational movement in a transmission shaft from which energy may be derived. Various features directed to the specific configuration of the float member, support arm member, transmission mechanism, including the structure of a transmission shaft and a clutch mechanism, are also disclosed.

Pedersen, U.S. Pat. No. 4,864,152 discloses a floating water current power station comprising a ring-shaped pontoon, which by means of a mooring bit is anchored to anchors. All turbines are detachably arranged on a common beam and can, as a unit, be swung up to the surface within the area limited by the ring pontoon. The power station may swing around the bit, the upper end of which is connected to a front pontoon, and a lower end of which is secured to the anchors, and which is moreover provided with tension distributing warps to the turbine beam, and warps to the same pontoon side as the one to which the bit is secured.

Marino, U.S. Pat. No. 5,184,915 discloses an apparatus for lifting up water to a predetermined level where it can be useful, using the inexhaustible and non-polluting source of energy of the ocean tides to do so. The apparatus comprises a water chamber positioned to be filled with water following a rise in tide. Rising on the tide causes some air to be trapped and pressurized on top of the chamber. This pressurized air in turn is used to push some water up to the predetermined level.

The related art described above discloses apparatus and methods for converting water motion and weight to useful energy. However, the prior art fails to disclose the presently described compression chamber system having the ability to adapt to tidal ocean levels and to wave heights. The present disclosure distinguishes over the prior art providing heretofore unknown advantages as described in the following summary.

BRIEF SUMMARY OF THE INVENTION

This disclosure teaches certain benefits in construction and use which give rise to the objectives described below.

A stationary structure is mounted on the floor of an ocean or other body of water subject to wave motion. The structure provides a floatation body that moves with the waves and is able to drive a sealing plate in a compression chamber. When the water level changes, or wave action magnitude changes, a second sealing plate is able to move automatically to maintain a constant size of the compression chamber. Air compressed in the chamber is let into a tank to maintain a constant elevated pressure in the tank and the air pressure is used to power a turbine to generate electricity.

A primary objective inherent in the above described apparatus and method of use is to provide advantages not taught by the prior art.

Another objective is to provide a wave motion adaptive and tidal levels adaptive air compression system that uses the wave motion for maintaining a constant air pressure for driving a generator turbine or performing other useful work.

A further objective is to provide such a system that may be mounted on the ocean floor or on the ocean surface.

A still further objective is to provide such a system that is fully automated in its operation.

A yet further objective is to provide such a system that also uses water momentum giving rise to lateral forces for driving air compressors.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention In such drawing(s).

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

Figure 1:
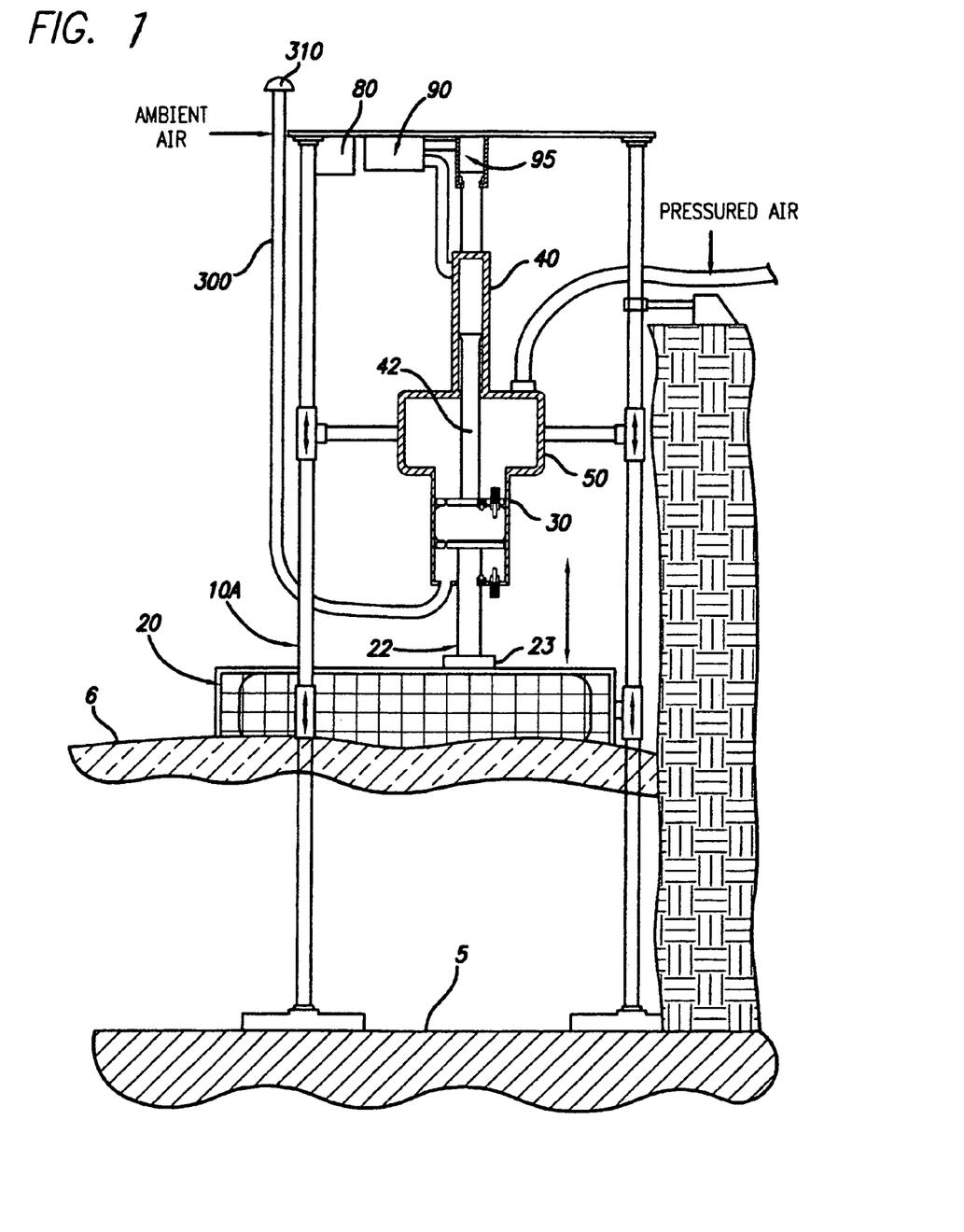
FIG. 1 is a front elevational schematic of a first embodiment of the present invention showing a structure standing on the ocean floor.
Figure 2:
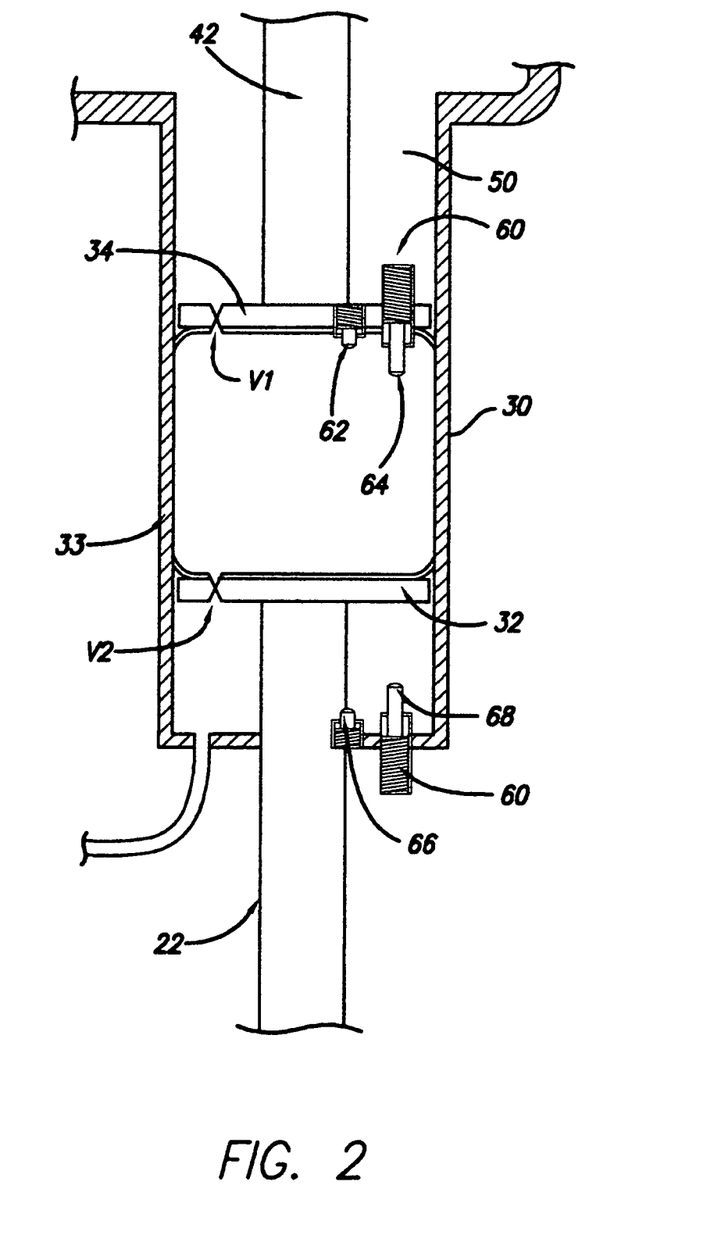
FIG. 2 is a sectional schematic of a compression chamber thereof.

Described now in detail, in a first embodiment shown in FIG. 1 is an apparatus for using ocean wave motion when the ocean is not too deep, to compress and deliver air to a generator (not shown). The apparatus has a frame 10A adapted for standing on an ocean floor 5 while extending above a corresponding ocean surface 6. The frame 10A supports a buoyant body 20 floating on the ocean surface 6 and freely riding vertically on the frame 10A according to ocean wave motion. A portion of the apparatus is enlarged, as shown in FIG. 2, showing a compression chamber 30 with a lower 32 and an upper 34, spaced apart and axially movable, sealing plates establishing a sealed variable volume 33 therebetween. The lower sealing plate 32 is joined fixedly to the buoyant body 20 by a lower connecting rod 22, and the upper sealing plate 34 is joined to a linear actuator 40 by an upper connecting rod 42.

A compressed air storage tank 50 is positioned to receive compressed air through an upper valve V1 in the upper sealing plate 34. A sensory system 60 is adapted for sensing the relative positions of the sealing plates 32 and 34, so that when the ocean wave motion moves the lower sealing plate 32 toward the upper sealing plate 34, air is compressed within the sealed variable volume 33, said compressed air moving into the storage tank 50 through an upper valve V1 when pressure in the sealed variable volume 33 exceeds pressure within the storage tank 50. Sensors 62, 64, 66, and 68 provide feedback as to when the sealing plates 32 and 34 are outside set point ranges in their physical excursions. Feedback signals are sent to a computer.

A lower valve V2 in the lower sealing plate 32 is adapted to maintain a positive pressure within the sealed variable volume 33 at all times.

A control system 80, such as a computer based system, is adapted to cause the linear actuator 40 to move the upper sealing plate 34 vertically to adjust for a vertical range of motion of the lower sealing plate 32 thereby compensating for changing tidal and wave height conditions and maintaining volume 33 constant as an average value. Hydraulic system 90 moves linear actuator 40 and also linear actuator 95 which is designed to move elements 30, 40 and 50 together to accommodate tidal variations in the ocean.

Figure 3:
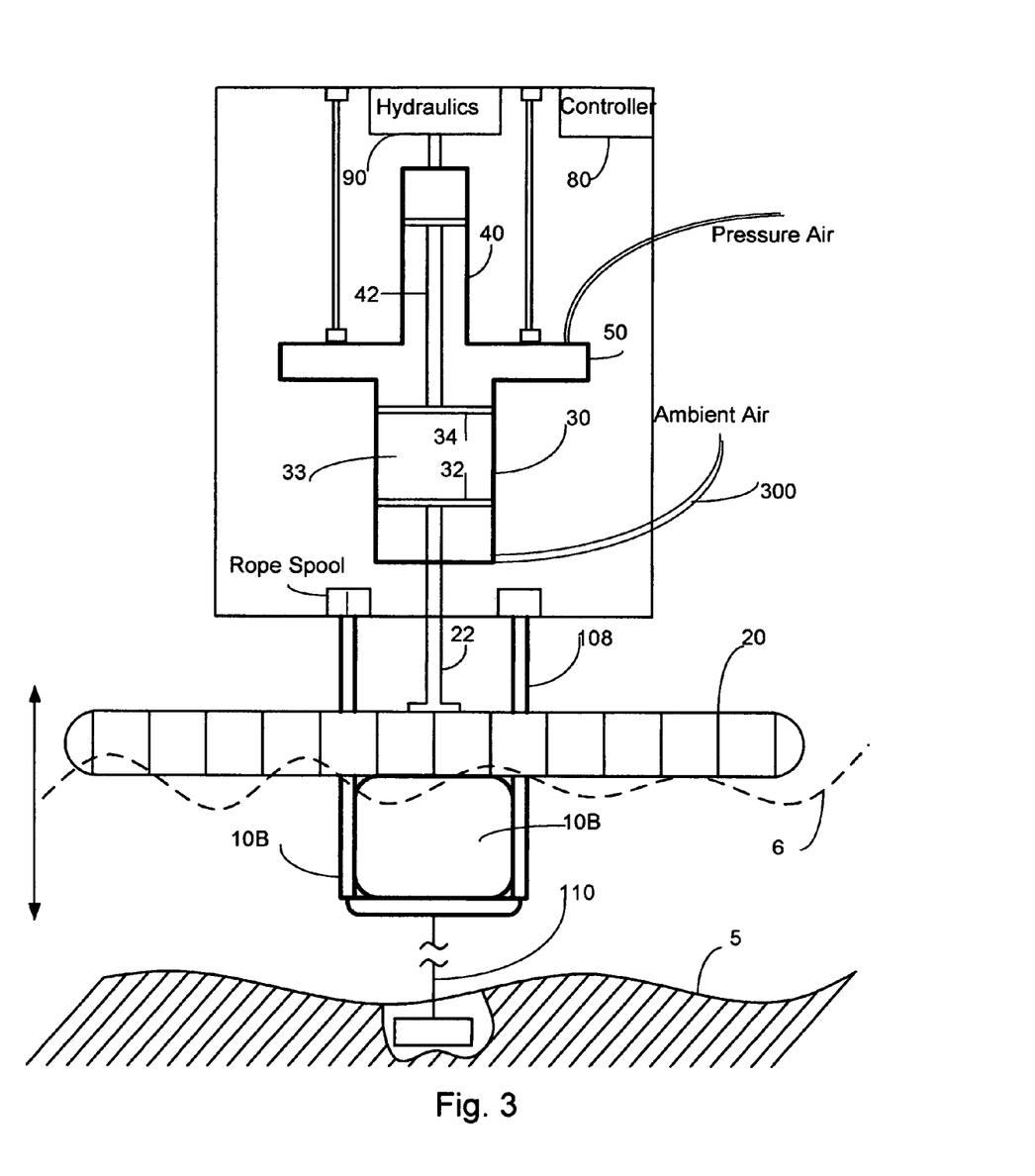
FIG. 3 is a front elevational schematic of a second embodiment of the present invention showing a structure that is supported by a subsurface floatation platform.

A second embodiment of the present invention is shown in FIG. 3, for using ocean wave motion when the ocean is too deep for using the structure shown in FIG. 1. In this embodiment, a frame 10B is mounted on a subsurface floatation platform 100 which is tethered to the ocean floor 5 using mooring cables 110 or a similar tether. In all other respects the apparatus is identical to that of the first embodiment described above.

Figure 4:
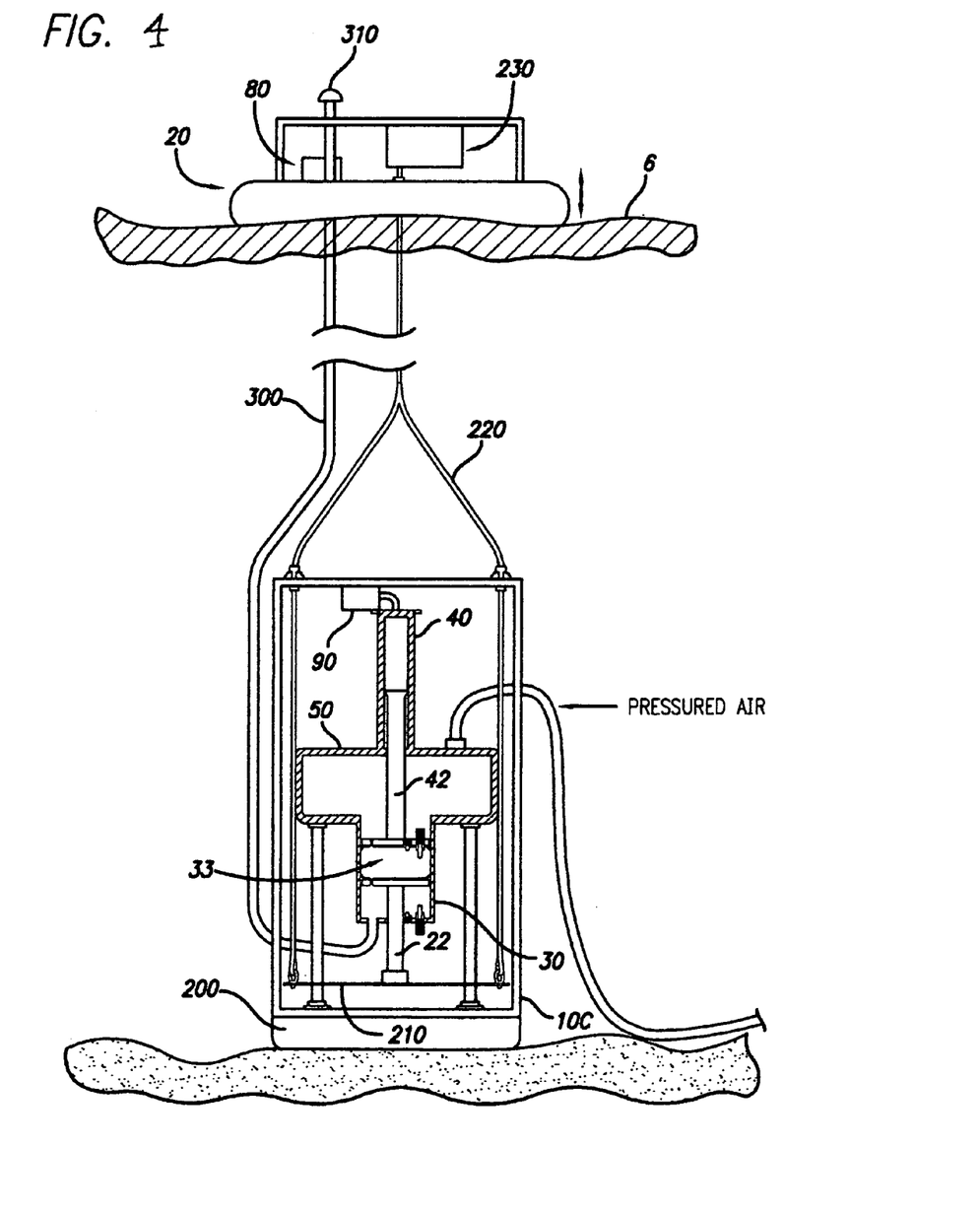
FIG. 4 is a front elevational schematic of a third embodiment of the present invention showing a structure that is supported by the ocean floor.
Figure 5:
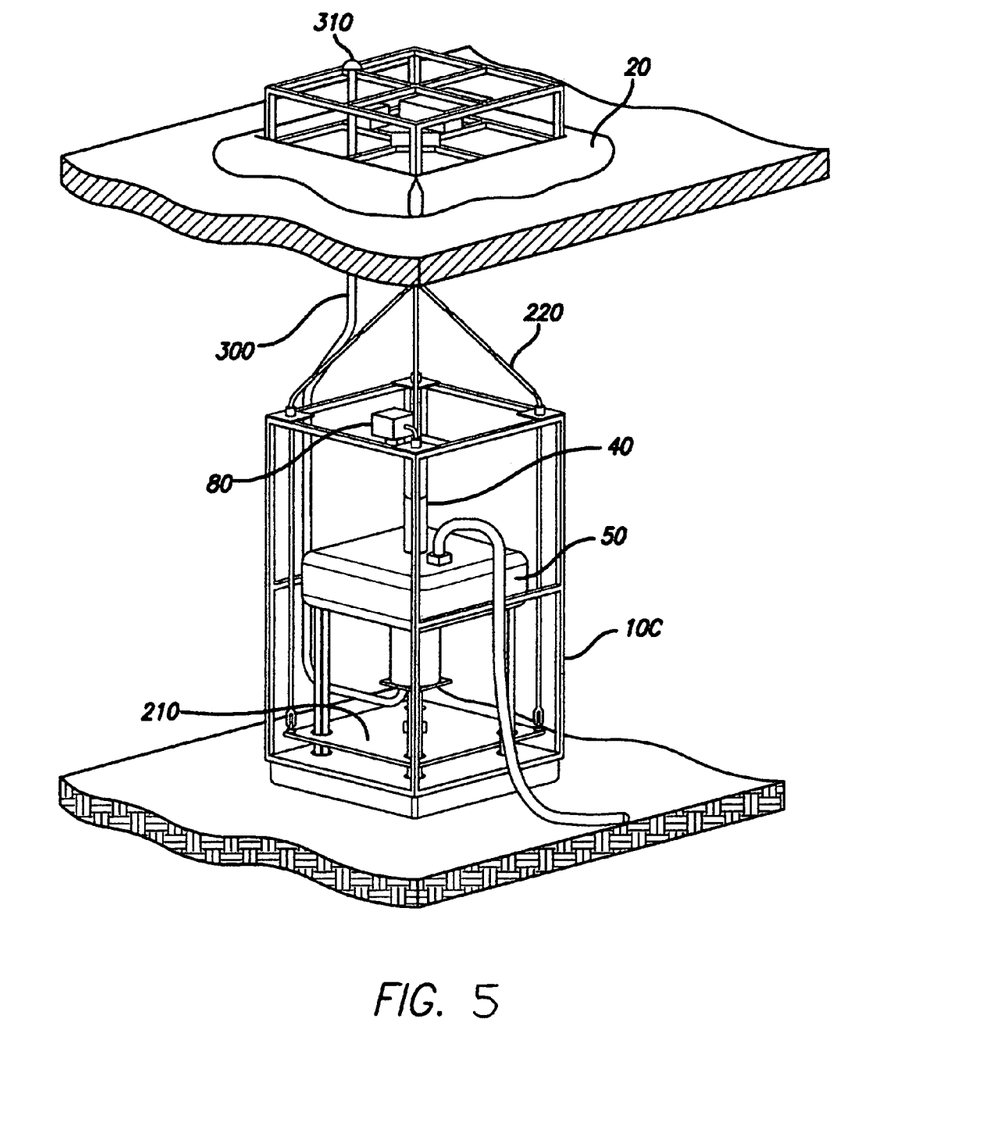
FIG. 5 is a perspective schematic of the embodiment of FIG. 4.

A third embodiment of the present invention is shown in FIG. 4, for using ocean wave motion when it is desired to place the bulk of the apparatus below the ocean surface 6 so that the system is less visible from nearby land. In this embodiment, a frame 10C is mounted on the ocean floor 5 and may be fixedly secured by concrete foundations 200 embedded in the floor 5, or by sandbags for instance when a temporary installation is desired. The frame 10C is joined with buoyant body 20 floating on the ocean surface 6 where body 20 is freely riding with the ocean's waves according to ocean wave motion. The compression chamber 30 is supported fixedly within frame 10C and platform 210 is joined to lower sealing plate 32 by connecting rod 22 and to body 20 by cables 220 so that platform 210 is forced to move vertically upward with body 20 and moves vertically downward under the forces of pressure within the compression chamber 30 when body 20 moves into a wave trough. It is noted, that spring loaded spool 230 keeps cables 220 taught.

In each of the three embodiments, an air conduit 300 is engaged with the apparatus with a conduit inlet 310 positioned so as to not receive water therein, but rather to allow ambient air to be brought to the compression chamber 30 to assure that the air pressure in chamber 30 is never below atmospheric. For instance, when the lower sealing plate 32 drops downwardly suddenly the chamber 30 will tend to move to a negative pressure, but at that time V2 will open to allow atmospheric air into the chamber 30. Upon moving upwardly, the lower sealing plate 32 compresses the air within chamber 30 and when pressure within chamber 30 exceeds the nominal pressure in tank 50 which drops continuously as air is used in an on-shore turbine, valve V1 opens to force air within chamber 30 into tank 50.

Figure 6:
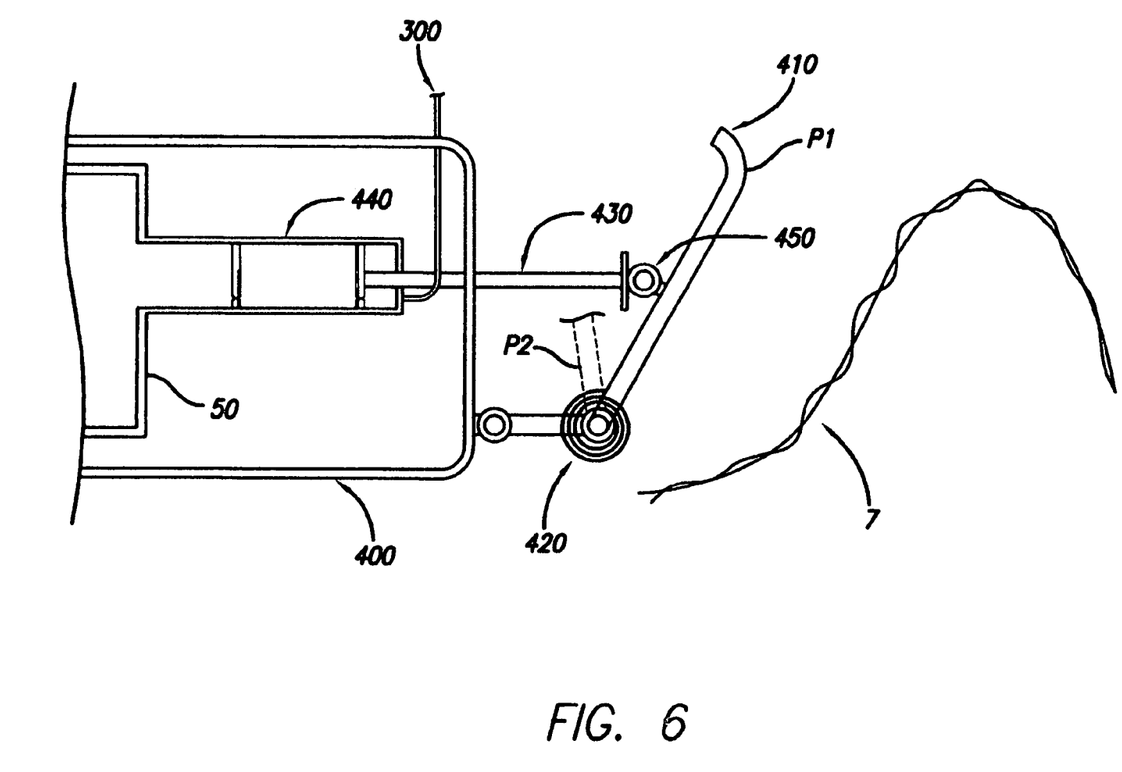
FIG. 6 is a front elevational schematic of a forth embodiment of the present invention for a lateral wave force compressor.
Figure 7:
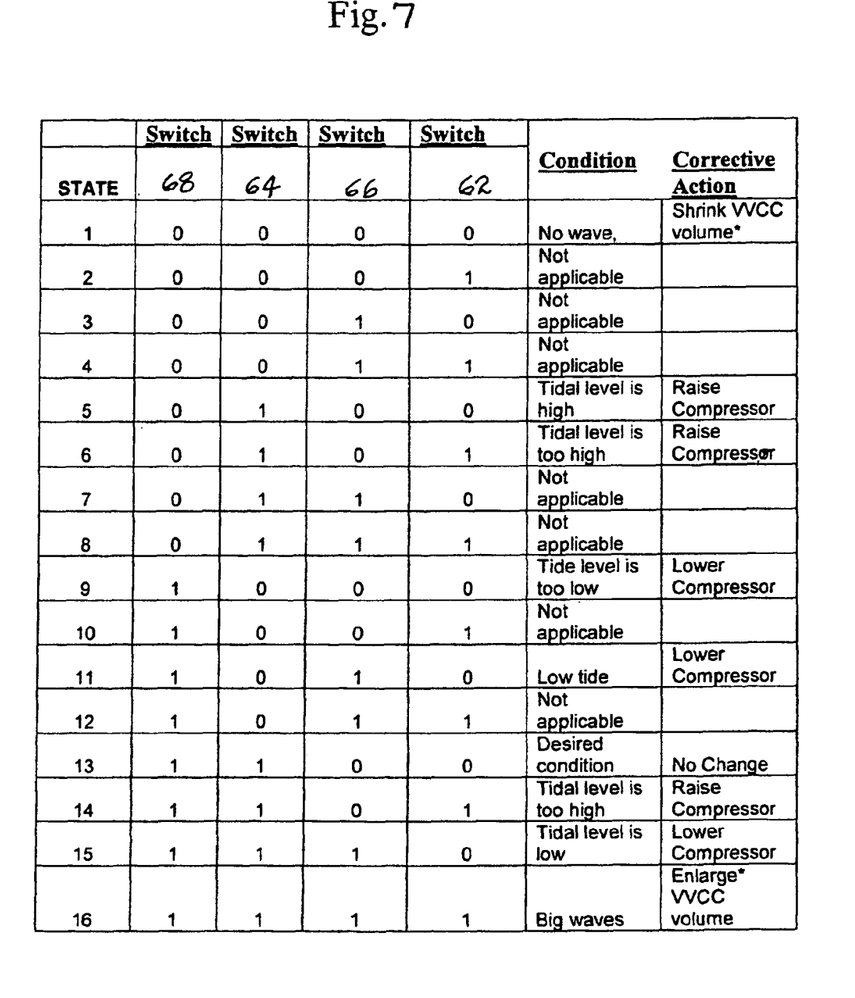
FIG. 7 is a truth table showing the possible conditions of the sensor switches of FIG. 2.

A forth embodiment of the present invention is shown in FIG. 6 for using horizontal forces of the ocean wave motion for near shore and offshore embodiments.

In any of the previously described embodiments, a further means of providing compressed air may be employed. In FIG. 6 is shown an apparatus 400 that may be engaged with buoyant body 20 and which provides a hinged flap or paddle 410 positioned for receiving ocean waves 7 thereagainst. The hinged flap 410 is rotatable between an outwardly directed position P1, as urged by a spring 420 engaged therewith, and an upright position P2 as urged by ocean wave 7 which drives against flap 410. Flap 410 in turn, drives a connecting rod 430 of a compression pump 440 whereby cyclic motion of the flap 410 causes reciprocating action of the compression pump (arrow "A"), thereby directing compressed air to the storage tank 50. A hinge 450 is used to join flap 410 with rod 430.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. An air compressing apparatus comprising: a compression chamber having therein, first and second sealing plates that are spaced apart, axially movable, and establish a sealed variable volume there between, the first sealing plate joined axially to a first connecting rod and thereby to a means for imparting reciprocating motion to the first sealing plate;

the second sealing plate joined axially to a second connecting rod and thereby to a means for adjusting an axial position of the second sealing plates within the compression chamber for varying the volume between the first and second sealing plates;

a compressed storage tank positioned to receive compressed air through an outlet valve in the second sealing plate;

and a sensory system adapted for sensing the relative positions of the first and second sealing plates;

wherein, axial movement of the first sealing plate toward the second sealing plate compresses air within the sealed variable volume;

said compressed air moving into the storage tank through the outlet valve when pressure in the sealed variable volume exceeds pressure within the storage tank, a frame standing on a buoyant, subsurface support, the support tethered to an ocean floor;

the frame extending above a corresponding ocean surface;

a buoyant body floating on the ocean surface and engaged with the frame for freely riding vertically on the frame according to ocean wave motion, the buoyant body interconnected with the first sealing plate through the first connecting rod for moving the first sealing plate in reciprocating motion according to ocean wave motion thereby providing said means for imparting reciprocating motion to the first sealing plate;

an inlet valve in the first sealing plate, the inlet valve adapted for maintaining a positive pressure within the sealed variable volume.

2. The apparatus of claim 1 further providing a control system adapted to adjust the compression chamber vertically for at least one of wave height and tidal variations.

3. An air compressing apparatus comprising: a compression chamber having therein, first and second sealing plates that are spaced apart, axially movable, and establish a sealed variable volume there between, the first sealing plate joined axially to a first connecting rod and thereby to a means for imparting reciprocating motion to the first sealing plate;

the second sealing plates joined axially to a second connecting rod and thereby to a means for adjusting an axial position of the second sealing plate within the compression chamber for varying the volume between the first and second sealing plates;

a compressed air storage tank positioned to receive compressed air through an outlet valve the second sealing plate;

and a sensory system adapted for sensing the relative positions of the first and second sealing plates;

wherein, axial movement of the first sealing plates toward the second sealing plate compresses air within the sealed variable volume;

said compressed air moving into the storage tank through the outlet valve when pressure in the sealed variable volume exceeds pressure within the storage tank;

a frame mounted on an ocean floor, a buoyant body floating on a corresponding ocean surface above the frame an freely riding vertically thereon according to the ocean wave motion;

the buoyant body interconnected with the first sealing plates through the first connecting rod and a linkage enabled for moving the first sealing plate in reciprocating motion according to ocean wave motion thereby providing said means for imparting reciprocating motion to the first sealing plate;

an inlet valve in the first sealing plate, the inlet valve adapted for maintaining a positive pressure within the sealed variable volume through a snorkel.

4. The apparatus of claim 3 further providing a control system adapted to adjust the compression chamber vertically for at least one of wave height and tidal variation.

* * * * *